(12) United States Patent
Sandhar

(10) Patent No.: US 11,767,674 B2
(45) Date of Patent: Sep. 26, 2023

(54) SYNTHETIC FABRIC HAVING SLIP RESISTANT PROPERTIES AND METHOD OF MAKING SAME

(71) Applicant: FT SYNTHETICS INC., Langley City (CA)

(72) Inventor: Gurpreet Singh Sandhar, Langley (CA)

(73) Assignee: FT SYNTHETICS INC., Langley City, CA (US)

( * ) Notice: Subject to any disclaimer, the term of this patent is extended or adjusted under 35 U.S.C. 154(b) by 0 days.

(21) Appl. No.: 18/061,366

(22) Filed: Dec. 2, 2022

(65) Prior Publication Data

US 2023/0096881 A1 Mar. 30, 2023

Related U.S. Application Data

(63) Continuation of application No. 16/706,137, filed on Dec. 6, 2019, now Pat. No. 11,542,711, which is a
(Continued)

(51) Int. Cl.
*E04D 12/00* (2006.01)
*B32B 5/02* (2006.01)
(Continued)

(52) U.S. Cl.
CPC .......... *E04D 12/002* (2013.01); *B29C 59/025* (2013.01); *B32B 5/022* (2013.01);
(Continued)

(58) Field of Classification Search
CPC ..... E04D 12/002; B29C 59/025; B32B 5/022; B32B 5/028; B32B 11/10; B32B 27/12; B32B 27/32; B32B 27/34; B32B 27/36; B32B 37/15; B32B 38/004; B32B 37/20; B32B 2262/0253; B32B 2262/0261; B32B 2262/0276; B32B 2305/20;
(Continued)

(56) References Cited

U.S. PATENT DOCUMENTS

| | | | |
|---|---|---|---|
| 2,771,246 A | 11/1956 | Schneider et al. | |
| 3,203,678 A | 8/1965 | Sawyer et al. | |

(Continued)

FOREIGN PATENT DOCUMENTS

| | | | |
|---|---|---|---|
| CA | 2237712 A1 | 6/1997 | |
| CA | 2239164 A1 | 7/1997 | |

(Continued)

*Primary Examiner* — Jeffrey M Wollschlager
(74) *Attorney, Agent, or Firm* — GREENBERG TRAURIG, LLP

(57) ABSTRACT

A synthetic nonwoven fabric having bonded fibers forming channels surrounding unbonded fibers forming raised slip resistant spots. The fabric is made by extruding hot polymer through a spinneret die onto a moving belt to form a sheet of random fibers, which sheet undergoes a calendering process between a pair of heated rollers, one of which rollers having a plurality of cavities defined in its surface. The resulting fabric can be laminated and otherwise combined with other layers as desired to provide an end product having good slip resistant properties.

20 Claims, 12 Drawing Sheets

Related U.S. Application Data continuation of application No. 15/114,178, filed as application No. PCT/CA2015/050082 on Feb. 4, 2015, now abandoned.

(60) Provisional application No. 61/935,797, filed on Feb. 4, 2014.

(51) Int. Cl.
  *B32B 27/12* (2006.01)
  *B32B 27/34* (2006.01)
  *B32B 11/10* (2006.01)
  *B32B 27/32* (2006.01)
  *B32B 27/36* (2006.01)
  *B32B 37/15* (2006.01)
  *B32B 38/00* (2006.01)
  *D01D 5/00* (2006.01)
  *B29C 59/02* (2006.01)
  *B32B 37/20* (2006.01)

(52) U.S. Cl.
  CPC .............. *B32B 5/028* (2013.01); *B32B 11/10* (2013.01); *B32B 27/12* (2013.01); *B32B 27/32* (2013.01); *B32B 27/34* (2013.01); *B32B 27/36* (2013.01); *B32B 37/15* (2013.01); *B32B 38/004* (2013.01); *D01D 5/00* (2013.01); *B32B 37/20* (2013.01); *B32B 2262/0253* (2013.01); *B32B 2262/0261* (2013.01); *B32B 2262/0276* (2013.01); *B32B 2305/20* (2013.01); *B32B 2307/7265* (2013.01); *B32B 2307/744* (2013.01); *B32B 2309/12* (2013.01); *B32B 2398/20* (2013.01); *B32B 2419/06* (2013.01)

(58) Field of Classification Search
  CPC ...... B32B 2307/7265; B32B 2307/744; B32B 2309/12; B32B 2398/20; B32B 2419/06; D01D 5/00
  See application file for complete search history.

(56) References Cited

U.S. PATENT DOCUMENTS

| | | | |
|---|---|---|---|
| 3,405,674 A | 10/1968 | Coates et al. | |
| 4,128,369 A | 12/1978 | Kemerer et al. | |
| 4,454,089 A | 6/1984 | Barker et al. | |
| 5,208,098 A | 5/1993 | Stover | |
| 5,219,635 A | 6/1993 | Weiter et al. | |
| 5,536,555 A | 7/1996 | Zelazoski et al. | |
| 5,614,281 A | 3/1997 | Jackson et al. | |
| 5,660,915 A | 8/1997 | Schoeps et al. | |
| 5,687,517 A | 11/1997 | Wiercinski et al. | |
| 5,858,515 A * | 1/1999 | Stokes | A44B 18/0011 156/181 |
| 5,942,452 A | 8/1999 | Daponte et al. | |
| 5,964,742 A * | 10/1999 | McCormack | D04H 1/54 604/380 |
| 6,296,912 B1 | 10/2001 | Zickell | |
| 6,308,482 B1 | 10/2001 | Strait | |
| 6,475,315 B1 | 11/2002 | Kean et al. | |
| 6,547,915 B2 | 4/2003 | Taylor et al. | |
| 6,629,340 B1 | 10/2003 | Dale et al. | |
| 6,782,808 B2 | 8/2004 | Downing et al. | |
| 6,925,766 B2 | 8/2005 | Di Pede | |
| 7,459,180 B2 | 12/2008 | Hamdar et al. | |
| 7,786,028 B2 | 8/2010 | Souther et al. | |
| 7,887,900 B2 | 2/2011 | DiPede | |
| 7,918,313 B2 | 4/2011 | Gross et al. | |
| 7,928,025 B2 | 4/2011 | Shipley et al. | |
| 7,977,259 B2 | 7/2011 | Ratcliff et al. | |
| 8,091,310 B2 | 1/2012 | Jones et al. | |
| 8,199,260 B2 | 6/2012 | Tanaka et al. | |
| 8,263,184 B2 | 9/2012 | Klingelhage et al. | |
| 8,728,605 B2 | 5/2014 | Payne et al. | |
| 8,765,251 B2 | 7/2014 | Strait | |
| 9,144,954 B2 | 9/2015 | Xiang | |
| 9,157,231 B2 | 10/2015 | Wingfield et al. | |
| 9,314,994 B2 | 4/2016 | Strait | |
| 2002/0178693 A1 | 12/2002 | Cherry | |
| 2003/0077964 A1 | 4/2003 | Klein | |
| 2003/0215594 A1 | 11/2003 | Hamdar et al. | |
| 2004/0023588 A1 | 2/2004 | Klein | |
| 2005/0210808 A1 | 9/2005 | Larson et al. | |
| 2006/0000541 A1 | 1/2006 | Hager et al. | |
| 2006/0043624 A1 | 3/2006 | Downing | |
| 2007/0275621 A1 | 11/2007 | Bennett et al. | |
| 2007/0294869 A1 | 12/2007 | Munstemann | |
| 2008/0020662 A1 * | 1/2008 | Strait | D04H 3/14 442/45 |
| 2008/0289289 A1 * | 11/2008 | Wiercinski | B32B 27/12 52/745.06 |
| 2008/0315465 A1 | 12/2008 | Smithies et al. | |
| 2009/0047465 A1 | 2/2009 | Zafiroglu | |
| 2009/0233046 A1 | 9/2009 | Iulianetti | |
| 2010/0005745 A1 * | 1/2010 | Harrington, Jr. | E04D 1/20 52/409 |
| 2010/0056004 A1 | 3/2010 | Galvin et al. | |
| 2010/0173110 A1 * | 7/2010 | Wiercinski | B32B 5/024 428/40.3 |
| 2010/0215924 A1 | 8/2010 | Di Pede | |
| 2010/0284740 A1 | 11/2010 | Sawyer et al. | |
| 2011/0027536 A1 | 2/2011 | Malpass et al. | |
| 2011/0281094 A1 * | 11/2011 | Zanchetta | E04D 5/10 428/440 |
| 2013/0084419 A1 | 4/2013 | Taylor et al. | |
| 2013/0247490 A1 | 9/2013 | Strait | |
| 2013/0288013 A1 | 10/2013 | Jones et al. | |
| 2014/0215962 A1 | 8/2014 | Xiang et al. | |
| 2015/0104614 A1 | 4/2015 | Gallant | |
| 2022/0364367 A1 | 11/2022 | Carr et al. | |

FOREIGN PATENT DOCUMENTS

| | | |
|---|---|---|
| CA | 2301123 A1 | 3/1999 |
| CA | 2418498 A1 | 8/2004 |
| CA | 2515231 A1 | 8/2004 |
| CA | 2597138 A | 8/2006 |
| CA | 2671555 A | 7/2008 |
| CN | 1042097 A | 5/1990 |
| CN | 1321209 A | 11/2001 |
| CN | 1329686 A | 1/2002 |
| CN | 1946530 A | 4/2007 |
| CN | 103173938 A | 6/2013 |
| EP | 1419754 A1 | 5/2004 |
| JP | H0482105 B2 | 12/1992 |
| WO | 99/14415 A1 | 3/1999 |

\* cited by examiner

SYNTHETIC FABRIC HAVING SLIP RESISTANT PROPERTIES AND METHOD OF MAKING SAME

RELATED APPLICATIONS

This application is a continuation of U.S. patent application Ser. No. 16/706,137, filed Dec. 6, 2019, entitled SYNTHETIC FABRIC HAVING SLIP RESISTANT PROPERTIES AND METHOD OF MAKING SAME, which is a continuation of U.S. patent application Ser. No. 15/114,178, filed Jul. 26, 2016, entitled SYNTHETIC FABRIC HAVING SLIP RESISTANT PROPERTIES AND METHOD OF MAKING SAME, which claims the benefit of priority to International Patent Application No. PCT/CA2015/050082, filed Feb. 4, 2015, entitled SYNTHETIC FABRIC HAVING SLIP RESISTANT PROPERTIES AND METHOD OF MAKING SAME, which claims the benefit of priority to U.S. Provisional Patent Application 61/935,797, filed Feb. 4, 2014, entitled SYNTHETIC FABRIC HAVING SLIP RESISTANT PROPERTIES AND METHOD OF MAKING SAME, the entire disclosures of which are incorporated herein by reference in their entireties.

FIELD OF THE INVENTION

The present invention is in the field of roofing materials. More particularly, the present invention is in the field of synthetic roofing membrane materials having slip resistant characteristics so as to provide suitable traction for roofing contractors during roof construction.

BACKGROUND OF THE INVENTION

The construction industry is a dangerous one for workers, with the most fatal injuries of any industry in the private sector. Many of the risks and hazards are apparent, but they can be difficult to control. One area that has received particular attention is the roofing industry, as one of the leading causes of injury on a construction site is falls from a height.

During roof construction, a roofing underlay is typically applied to the plywood roof prior to installation of shingles or tiles. Historically the roofing underlay was roofing felt or tar paper, both of which helped in waterproofing roofs to prevent the ingress of moisture. Tar paper is made by impregnating paper with tar, whereas roofing felt is impregnated with asphalt (bitumen). More recently, there has been a move to synthetic underlay products. They provide a good water barrier and have better physical strengths as compared to roofing felts and tar paper. However, while synthetic products made out of various polymers have better performance characteristics, they are generally slippery.

Accordingly, the focus has been on developing synthetic roofing underlay products with good performance characteristics and that have good anti-slip characteristics. There are two ways to enhance the slip resistance of the underlay products: "Mechanical" and "Chemical". There are many products in the market with Chemical slip resistance; however, the problem with Chemical slip resistance is that as soon as you have minute (0.5 mm) quantities of dust and/or frost on it, it gets covered and does not work anymore.

For example, U.S. Pat. No. 6,296,912 teaches a roofing membrane material comprising a woven or nonwoven fibrous mat having an adhesive asphalt coating.

U.S. Pat. No. 7,887,900 teaches a waterproofing roof underlay made of one or more layers of flexible sheet material consisting of woven or nonwoven synthetic polymers of polypropylene with a skid resistant pattern of polymer elements made from a plasticized polyvinyl chloride deposited on the top surface.

Efforts have also been made to develop a product with mechanical resistance. For example, U.S. Pat. No. 6,925,766 teaches an underlay comprising a flexible structural layer laminated to a mesh layer having interconnected reinforced strands and protruding nodes to provide increased traction.

While there are a variety of products currently in the market for various weather conditions, they all have shortcomings in wet (rainy) or cold (frost) conditions. Accordingly, there remains a need for a roofing underlay with good strength and water barrier characteristics that also has good anti-slip properties.

Objects of the invention will be apparent from the description that follows.

SUMMARY OF THE INVENTION

The invention consists of a synthetic roofing membrane material and method of manufacturing the same that provides a superior slip resistant surface in dry, wet or frosty conditions. The focus of the present invention has been Mechanical slip resistance at the top side and chemical slip resistance at the bottom side. The mechanical slip resistance is achieved by the use of a unique nonwoven top surface that has raised fibrous surfaces (random nonwoven fibers forming elevated slip resistant spots separated by channels) that create a high coefficient of friction (COF) when in contact with the footwear of the roofing membrane installer.

In one embodiment, the invention comprises a method of preparing a nonwoven fabric comprising forcing a thermoplastic polymer resin through a spinerette die onto a moving belt to form a sheet made of randomly oriented entangled fibers and then calendering the sheet between a pair of heated rolls, one of the heated rolls being an engraved roll with a plurality of cavities defined therein, to produce a calendered sheet having a plurality of elevated portions comprised of random unbonded fibers, wherein adjacent ones of the plurality of elevated portions being separated from one another by channels of bonded fibers.

Other aspects of the invention include one or more of the following:

- the other one of the heated rolls being a smooth roll having a smooth cylindrical outer surface;
- the heated rolls are heated to a temperature and exert a pressure on the sheet sufficient to form the channels of bonded fibers and the elevated portions of unbonded fibers;
- the engraved roll and the smooth roll being maintained at different temperatures;
- the engraved roll being maintained at a temperature between 142-146 degrees Celsius and the smooth roll being maintained at a temperature between 137-140 degrees Celsius;
- the cavities having a bottom surface at a depth greater than the height of a top surface of the elevated portions above a top surface of the channels such that an air pocket is formed between the top surface of the elevated portions and the bottom surface of the cavities during calendering of the sheet. The height is greater than 0.5 mm;
- adjacent cavities are separated by at least 0.5 mm;
- the thermoplastic polymer resin comprises polypropylene, polyethylene, polyester or nylon.

In another embodiment the invention comprises a method of making a nonwoven fabric comprising forcing a resin through a spinerette die onto a moving belt to form a sheet made of randomly oriented entangled fibers and calendering the sheet between a pair of heated rolls, one of the rolls being engraved with a pattern of cavities that allow an air pocket between the surface of the cavity and the fibers of the nonwoven sheet; heating the rolls to a temperature and exerting a pressure such that the fibers within the cavities form elevated surfaces of slip resistant spots that consist of random unbonded fibers and fibers falling outside the cavities are in direct contact with the heated calender rolls and melt sufficiently to form fused channels surrounding the elevated surfaces of unbonded fibers.

In another embodiment, the method further comprises laminating the calendered sheet with a waterproofing layer. It can further comprise a reinforcing scrim layer being laminated between the calendered sheet and the waterproofing layer.

In a further embodiment, the invention comprises a roofing membrane comprising a nonwoven layer of randomly oriented entangled fibers, the nonwoven layer having a top surface comprising a plurality of elevated portions having unbonded fibers, adjacent ones of the plurality of elevated portions separated by channels of fused fibers, and having a bottom surface of fused fibers; and a waterproofing layer laminated to the bottom surface.

The roofing membrane may further comprise a scrim reinforcement layer laminated between the nonwoven layer and waterproofing layer.

In a further embodiment, the invention comprises a nonwoven fabric comprising a plurality of randomly oriented, entangled fibers forming a sheet having a smooth bottom surface wherein said fibers are bonded and having a top surface comprising a plurality of elevated portions having unbonded fibers, said elevated portions surrounded by channels of fused fibers.

In another aspect, the fibers of the nonwoven fabric are formed from thermoplastic polymer resin. The channels have a width of at least 0.5 mm and the elevated portions have a top surface at least 0.5 mm above the channels.

The method further comprising air cooling the calendered sheet and passing it over water cooled rollers prior to rolling it to form a jumbo roll. The calendered sheet of nonwoven fabric can be further processed such as laminating it with a waterproofing membrane.

In another embodiment, the invention comprises a roofing membrane comprising a plurality of nonwoven fibers, said fibers bonded in portions to form depressed channels and portions of unbonded fibers forming elevated slip resistant surfaces.

In another embodiment, the invention comprises a roofing membrane comprising a nonwoven fabric comprising a plurality of nonwoven fibers, the fibers being bonded in portions to form depressed channels and unbonded in portions to form elevated slip resistant spots; and a waterproofing polyolefin layer laminated to the nonwoven fabric.

In another embodiment, the invention comprises a roofing membrane comprising a nonwoven fabric comprising a plurality of nonwoven fibers, the fibers being bonded in portions to form depressed channels and unbonded in portions to form elevated slip resistant spots; laminated to a reinforcing woven scrim layer which is laminated to a waterproofing polyolefin bottom layer.

The foregoing was intended as a broad summary only and of only some of the aspects of the invention. It was not intended to define the limits or requirements of the invention. Other aspects of the invention will be appreciated by reference to the detailed description.

BRIEF DESCRIPTION OF THE DRAWINGS

These and other features of the invention will become more apparent from the following description in which reference is made to the appended drawings and wherein.

DESCRIPTION OF THE PREFERRED EMBODIMENTS

Figure 1:
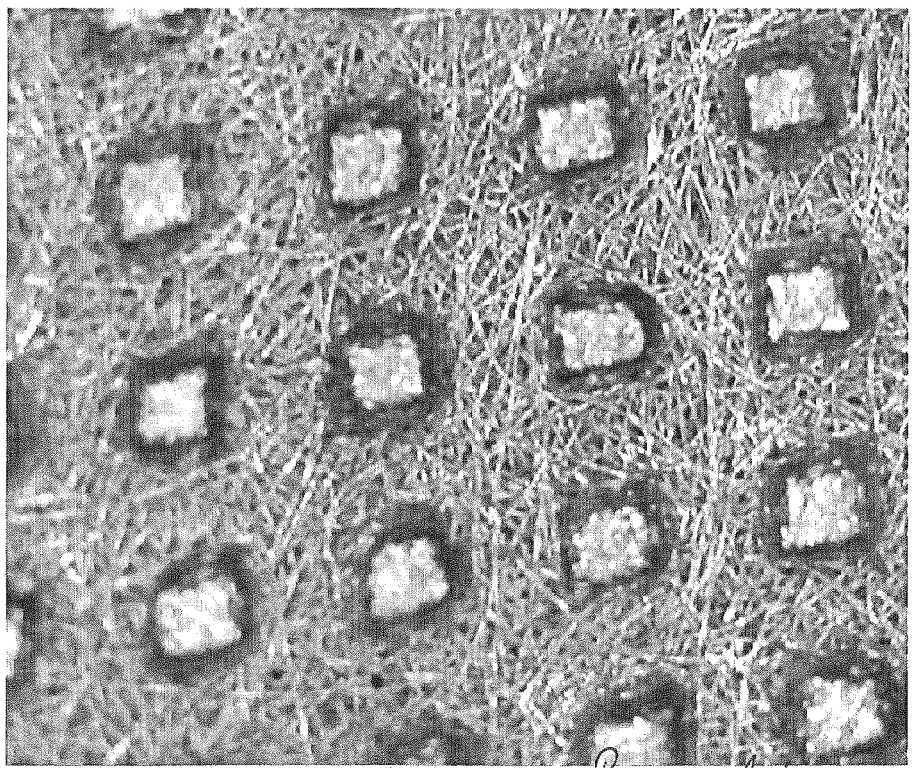
FIG. 1 is a top view of a prior art nonwoven fabric with spot bonding.

Nonwoven fabrics are commonly used in the manufacture of products, including roofing underlays. A regular nonwoven fabric is made by extruding a heated thermoplastic resin through a spinneret die unto a moving surface. The term "nonwoven" refers to the individual fibers which are randomly interlaid and entangled to form a web including a multitude of randomly distributed fibers. The web of fibers can be bonded to each other or unbonded. Known methods for bonding include thermal calendering, air bonding, and passing the web through a saturated steam chamber at an elevated pressure. Bonding by thermal calendering is done by "spot bonding", where one calender roll has a plurality of fine points which apply heat and pressure to the web to bond spots. FIG. 1 is a photograph of a nonwoven fabric shown with spot bonding as known in the art.

Figure 2:
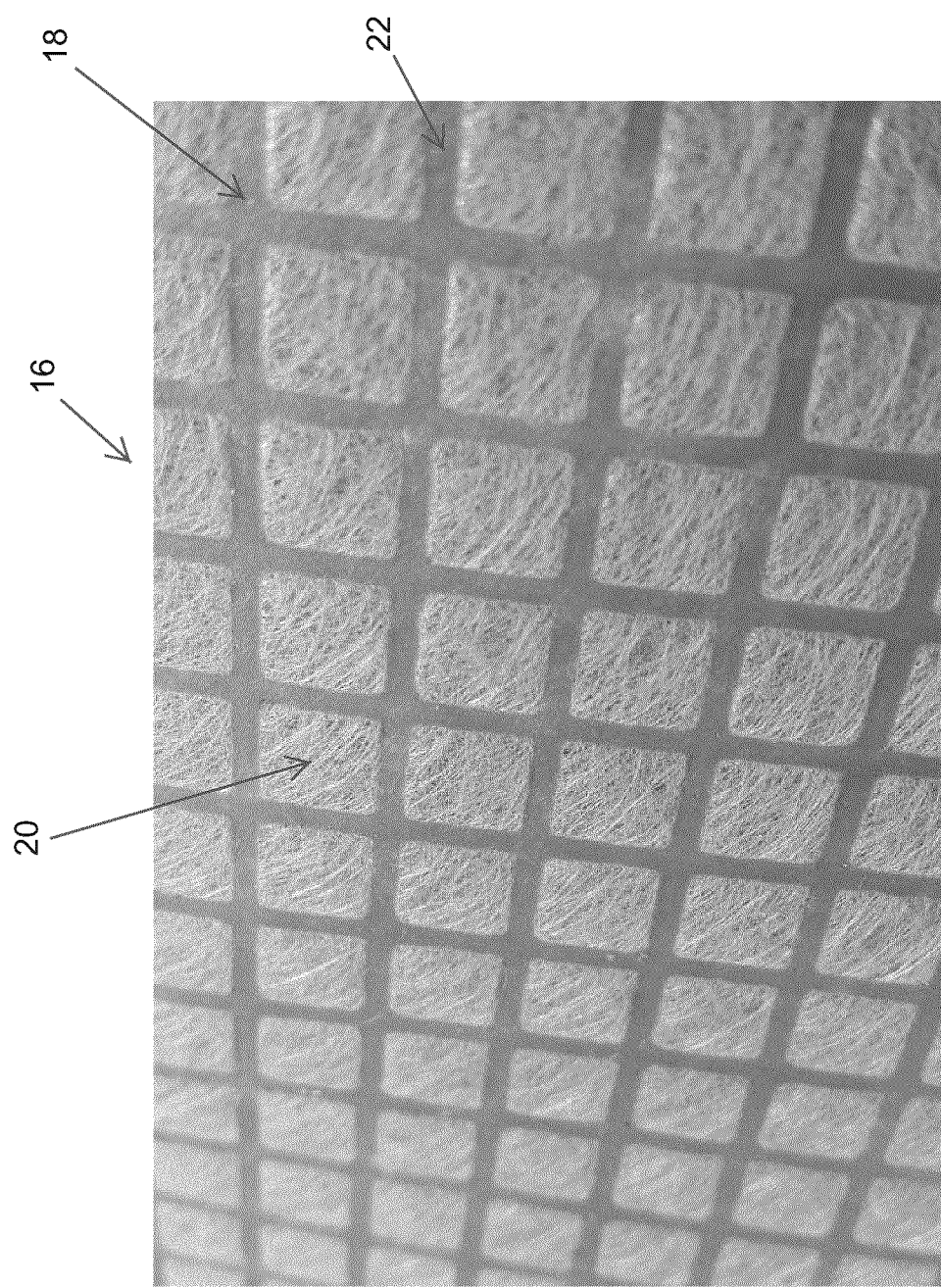
FIG. 2 is a top view of a high spot nonwoven fabric according to the present invention.
Figure 3:
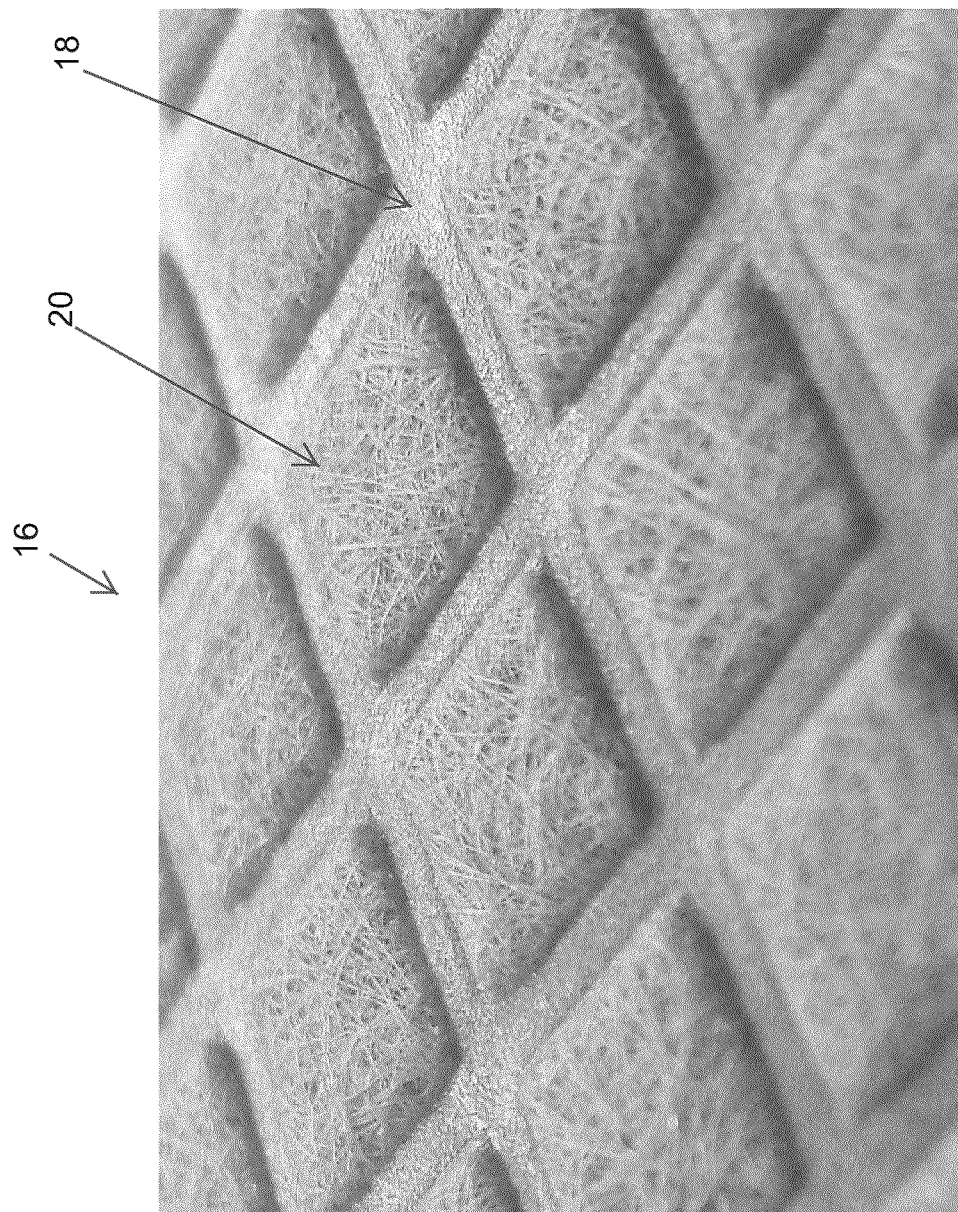
FIG. 3 is a perspective view of the nonwoven high spot fabric of FIG. 2.
Figure 4:
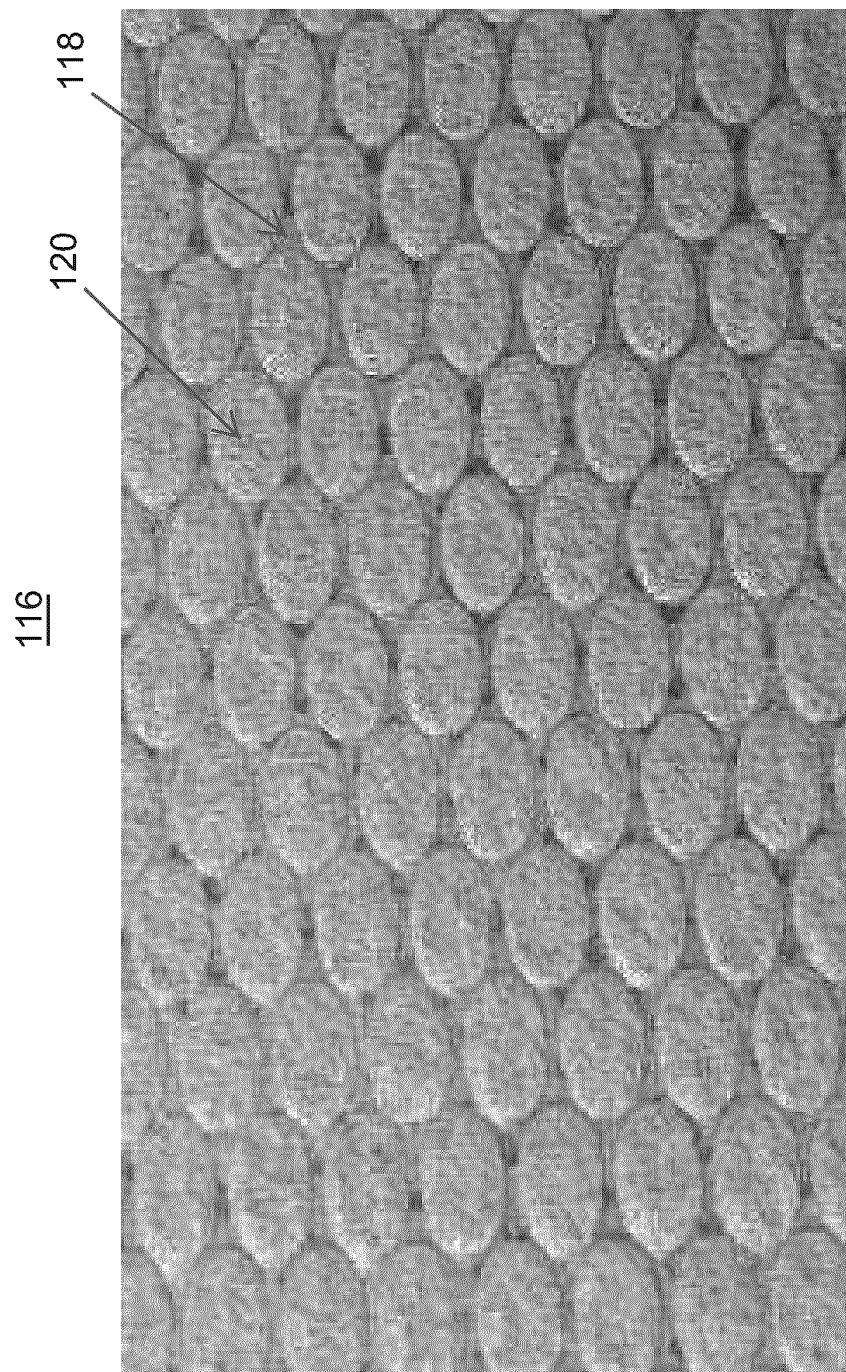
FIG. 4 is a top view of a nonwoven high spot fabric according to the invention showing an alternate high spot shape and pattern.
Figure 5:
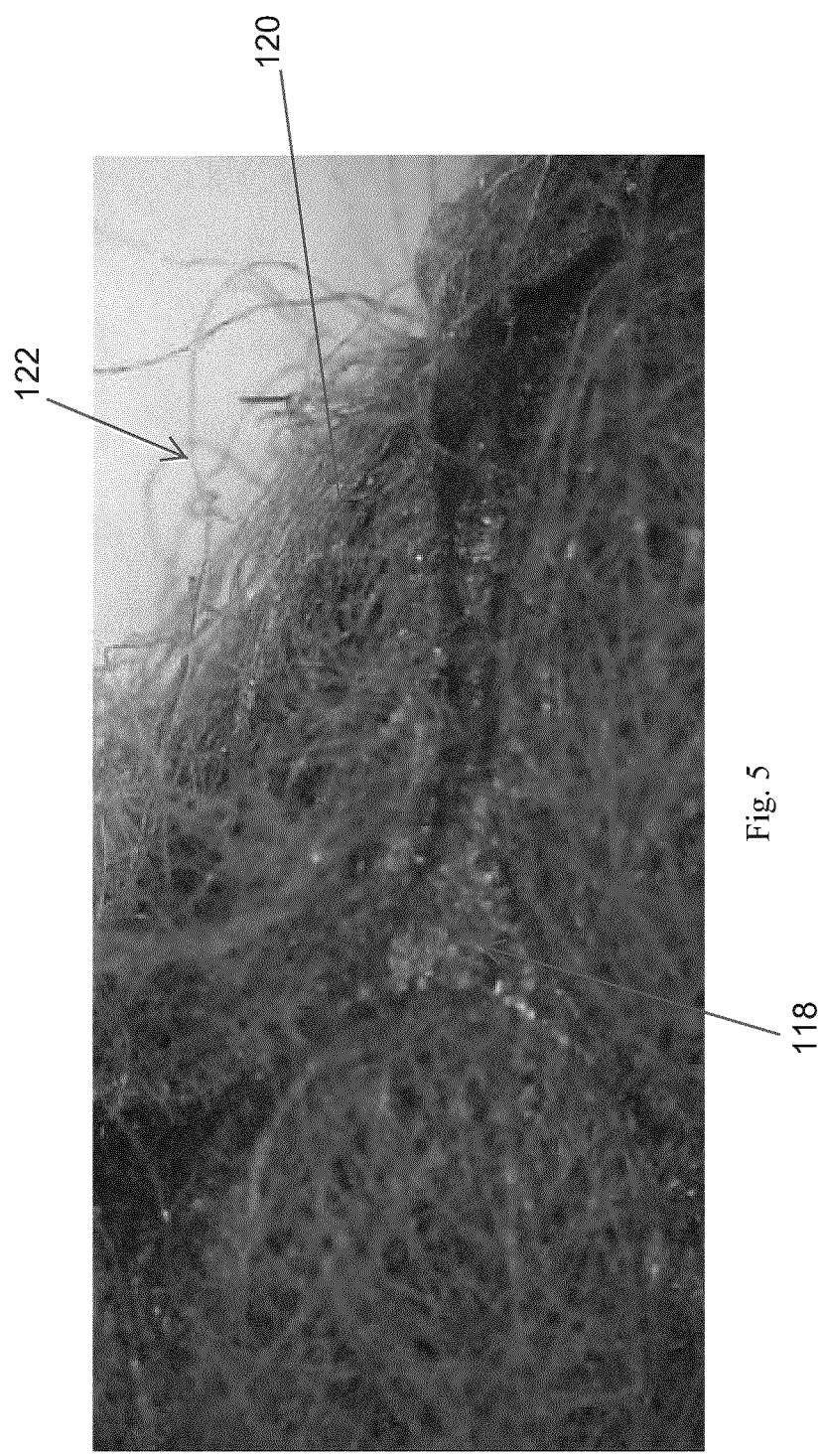
FIG. 5 is a magnified photo of a nonwoven high spot fabric showing the random web of unbonded fibers surrounded by channels of bonded fibers.

The present invention employs a novel calendering process to produce a spunbond nonwoven fabric 16 as shown in FIGS. 2 and 3. The nonwoven fabric has a plurality of channels 18 and elevated portions in the form of raised grip or "high spots" 20 defined along its upper surface 22. The bottom surface (not shown) is comprised of bonded fibers and is substantially smooth. The channels 18 are formed by compressed bonded fibers, with the grip or high spots comprising substantially unbonded fibers, especially at the upper surface 22. In FIG. 4, a different pattern is shown defined in the surface of the nonwoven fabric 116, with oval shaped slip resistant spots 120 in spaced separation from one another elevated above the bonded channels 118. FIG. 5 shows a close-up of the nonwoven fabric shown in FIG. 4, with the unbonded, random fibers 122 of the slip resistant spot 120 clearly visible. Of course, many different shapes and patterns for the slip resistant spots could be adopted, limited simply by ones imagination and the ability to form the required shape and pattern in the calendering roll. Preferably, the nonwoven grip or "high spot" fabric is comprised of filaments formed of polypropylene (PP) resin; however, it is also contemplated that other thermoplastic materials could be used, such as polyester, polyethylene, nylon and the like.

The elevated high spots in combination with the channels provide good traction even in wet conditions. Foreign material such as debris, dust, water and snow is diverted in the channels, leaving the high spots to provide a gripping surface.

Figure 6:
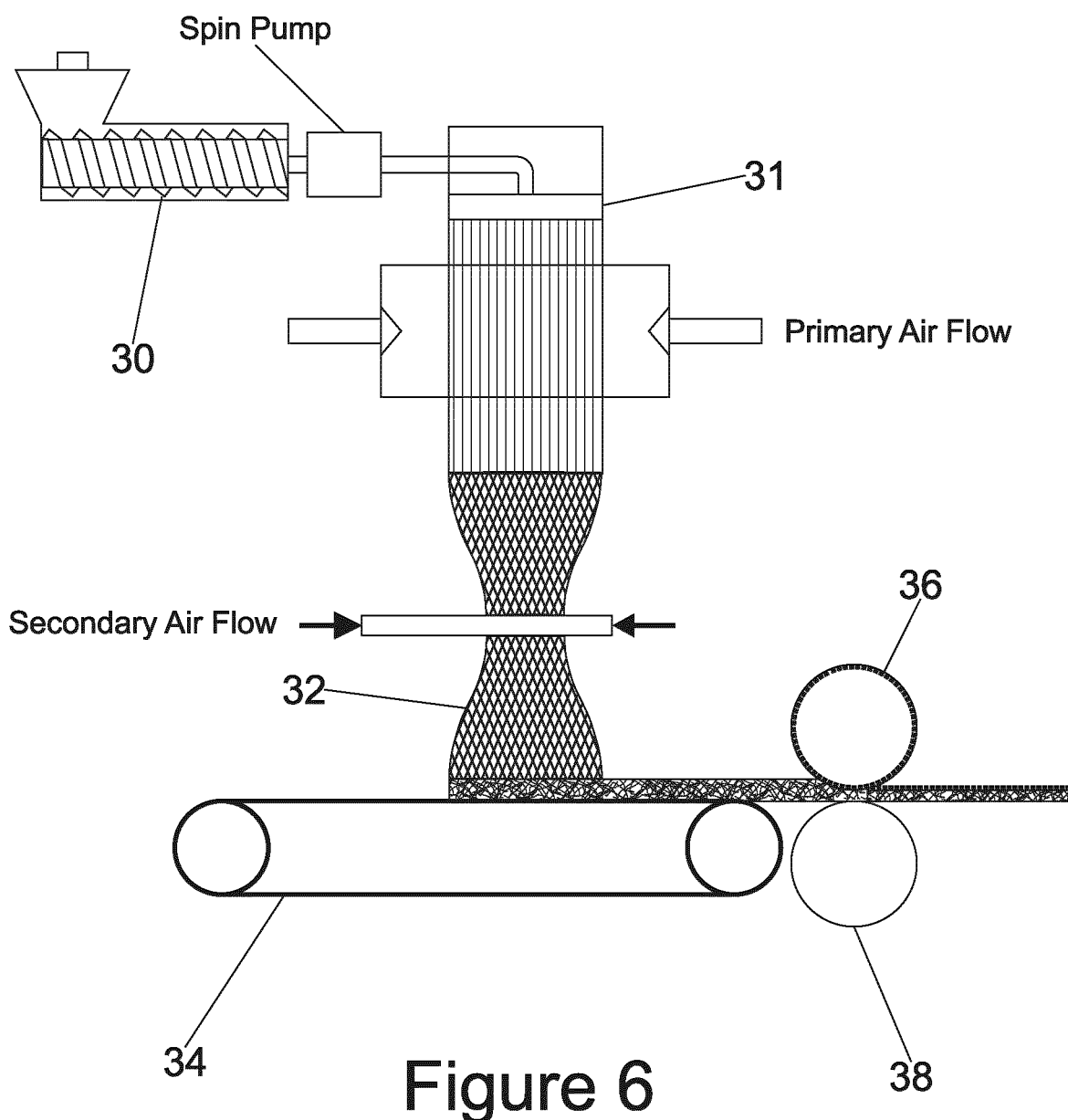
FIG. 6 is a schematic representation of a process for manufacturing the nonwoven high spot fabric of FIG. 2.
Figure 7:
FIG. 7 is a photograph of the roller used in the manufacture of the nonwoven high spot fabric of FIG. 2.
Figure 8:
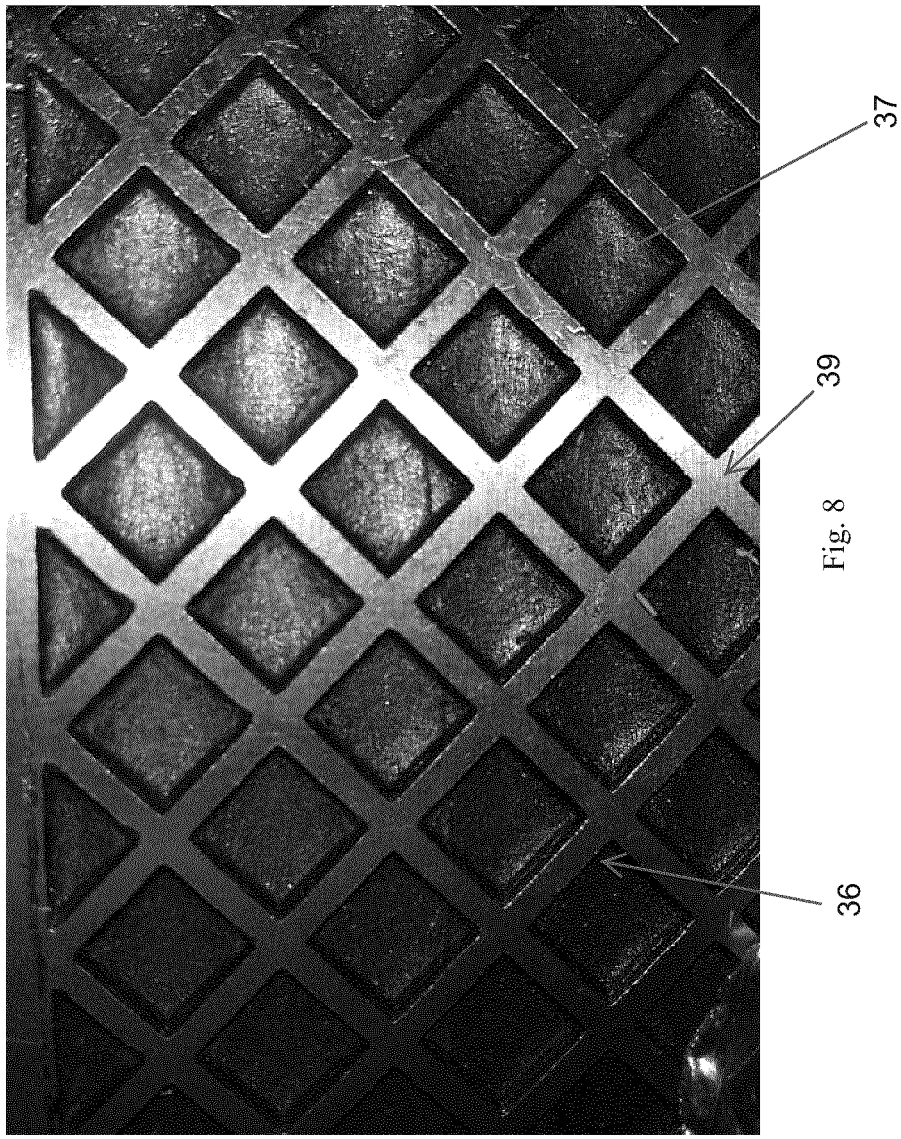
FIG. 8 is a close up photograph showing a portion of the roller shown in FIG. 7.

Production of the nonwoven high spot fabric is shown in FIG. 6. In order to produce the nonwoven high spot fabric, the thermoplastic polymer material (preferably PP resin) is heated until melted and the resulting molten material is extruded 30 through a spinneret die 31 to form long chains of fibers 32 that are sprayed onto a moving belt 34 forming a sheet of nonwoven (randomly oriented, entangled) fibers. The random web of nonwoven fibers 32 passes through a calendering process using our newly designed "high spot" cavity roller 36 and a standard roller 38. Cavity roller 36 is shown in FIGS. 7 and 8, with a cross-sectional view of a portion in FIG. 9. Cavity roller 36 is an engraved heated roller having a plurality of cavities 37 defined in its outer circumferential surface 39. Standard roller 38 is simply a heated roller with a smooth circumferential outer surface which generates the smooth bonded bottom surface of the nonwoven fabric 16.

Figure 9:
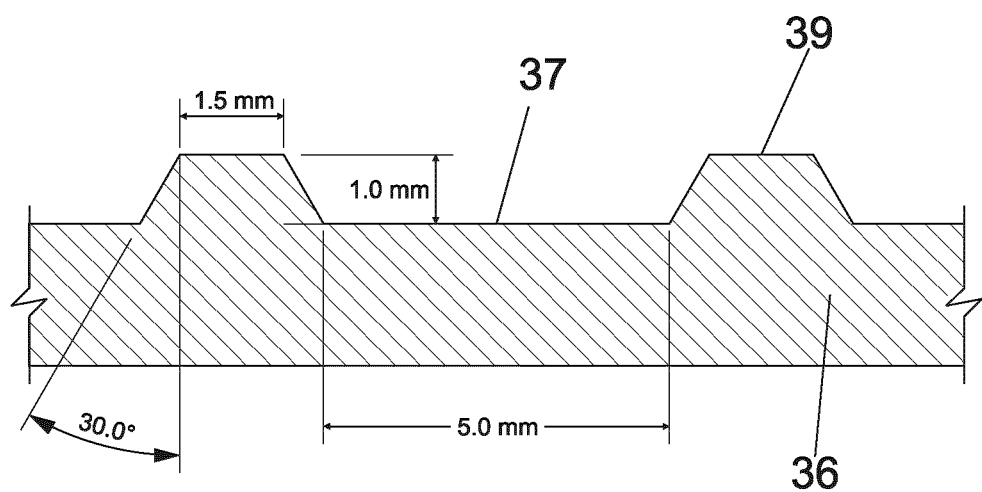
FIG. 9 is a cross-sectional view of a portion of the roller shown in FIG. 7 showing an engraved cavity in the roller.

An example of suitable dimensions for a cavity roller are shown in FIG. 9. In the embodiment shown, the cavities 37 are recessed approximately 1 mm into the surface of the roller and are 5 mm square at the deepest portion and approximately 6.1 mm at the surface. The cavities are spaced approximately 1.5 mm from each other, meaning that the resulting channels defined in the nonwoven fabric will be approximately 1.5 mm in width. Of course, other dimensions, shapes and patterns may be used, provided simply that the size of the recess in relation to the channel forming outer surface is controlled and that the depth of the cavity is sufficient to create a small air pocket between it and the nonwoven fibers contained therein during the calendering process creating a greatly reduced heat transfer from the heated embossing roll to the nonwoven fibers so that the surface fibers remain unbonded.

As a further example, the oval "high spots" 120 shown in FIG. 4 have channels that vary in width as a result of the nature of the oval shape. With this design, the channels are preferably at least 0.5 mm in width, with some portions (for example the junctions of three adjacent oval spots) being much greater; for example, up to 1.5 to 2 mm.

Product thickness must be sufficient to create the key requirements of the product:

The high spots must be suitably elevated relative to the channels, in the case of this example, preferably greater than 0.5 mm, and most specifically between 0.7 mm and 1 mm.

The top of the high spot must have non-bonded fibers to grip a roofer's shoes.

Proper width of the channels, preferably greater than 0.5 mm.

The calendering process is carefully controlled to ensure that the top surface of the high spots 20 remains a rough surface comprised of loose, unbonded fibers which create a slip resistant surface. While the presence of a high spot with bonded fibers does provide some traction, it is the presence of the unbonded fibers that provides additional traction.

When commencing production, the sheet of fibers is hand fed from the moving belt 34 to the rollers 36 and 38. Once fed through the nip (the gap between the rollers 36 and 38) and fed around the remaining rollers, the process can proceed uninterrupted. Both rollers 36 and 38 are heated, however need not be heated to the same temperature. The temperature of the rollers is important in the overall process and can be adjusted depending on the materials used and the thickness of the product. The rollers must be hot enough to ensure that the channel area is fused well, but not overheated. If overheated, the material will burn and lose its strength. For the product illustrated in FIG. 2, the temperature of roller 36 is preferably maintained between 142-146 degrees Celsius, while the temperature of roller 38 is preferably maintained between 137-140 degrees Celsius. The roller pressure is also important and must be adjusted depending on the thickness of the desired product.

After passing between the calendering cavity roll 36 and the standard roll 38, the fabric sheet continues along a series of rollers and is wound in a Jumbo Roll form. When it first exits the calender rolls, the sheet is air cooled by adjusting the line speed to give the non-woven enough time to cool down slightly then it is run over water cooled stainless steel rollers to ensure it is cooled and takes its final shape before winding it to form the Jumbo roll.

Figure 10:
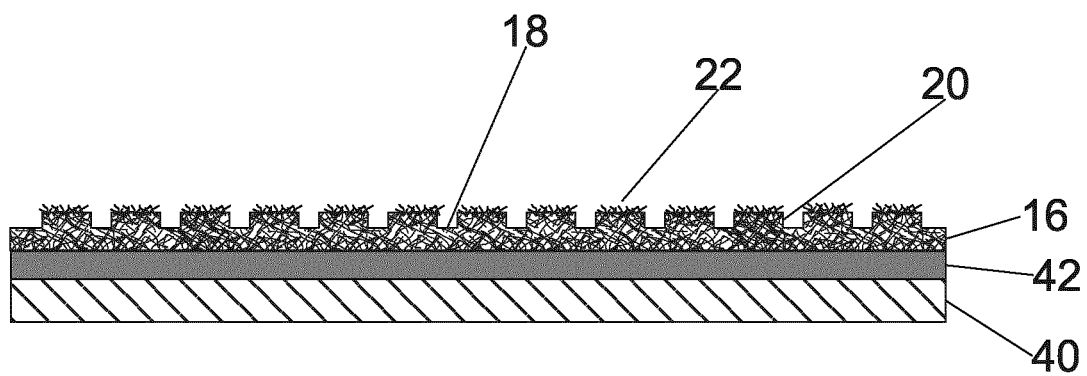
FIG. 10 is a cross-sectional view of a roofing underlay incorporating the nonwoven high spot fabric according to the invention.
Figure 11:
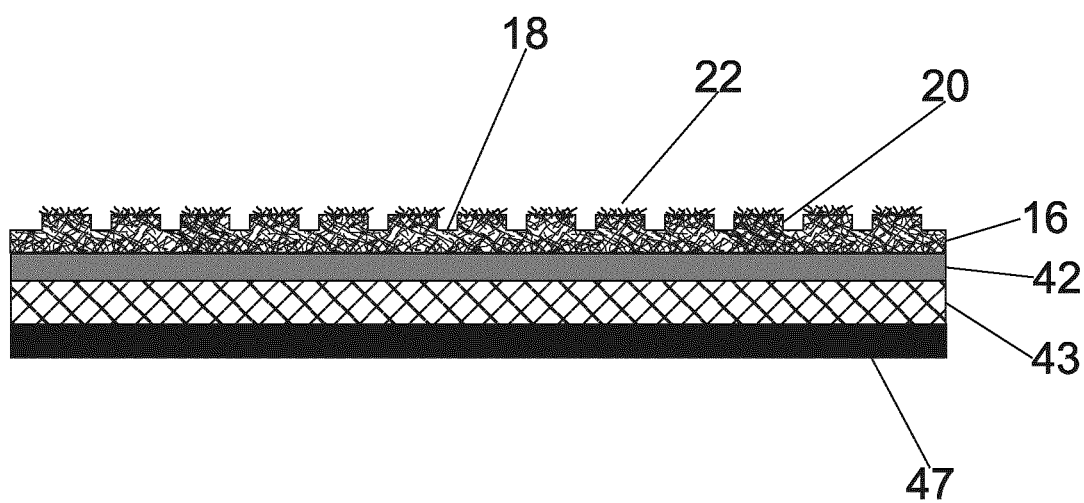
FIG. 11 is a cross-sectional view of a roofing underlay incorporating the nonwoven high spot fabric including a reinforcement scrim layer according to the invention.

In order to provide a waterproofing layer, the nonwoven high spot fabric must be bonded with a waterproofing membrane. These could form a number of different combinations. For example, the high spot nonwoven can be laminated to a regular nonwoven, the lamination layer forming a waterproof barrier as discussed in more detail below. Such a combination is illustrated in FIG. 10, which shows the high spot nonwoven fabric 16, lamination layer 42 and regular nonwoven 40 bonded together, with the high spots 20, channels 18 and random fibers at the top 22 of the high spots 20 visible. Alternatively, the high spot nonwoven could be laminated to a woven scrim or a leno scrim and laminated to a bottom barrier layer such as with EVA, TPE, or EMA films, with Natural Kraft, with an asphalt or bitumen layer, or with other polyolefin or polymeric layers. Such a combination is illustrated in FIG. 11, which shows the high spot nonwoven fabric 16, lamination layer 42, woven reinforcing scrim layer 43 and bottom barrier layer 47 bonded together, with the high spots 20, channels 18 and random fibers at the top 22 of the high spots 20 visible.

Figure 12:
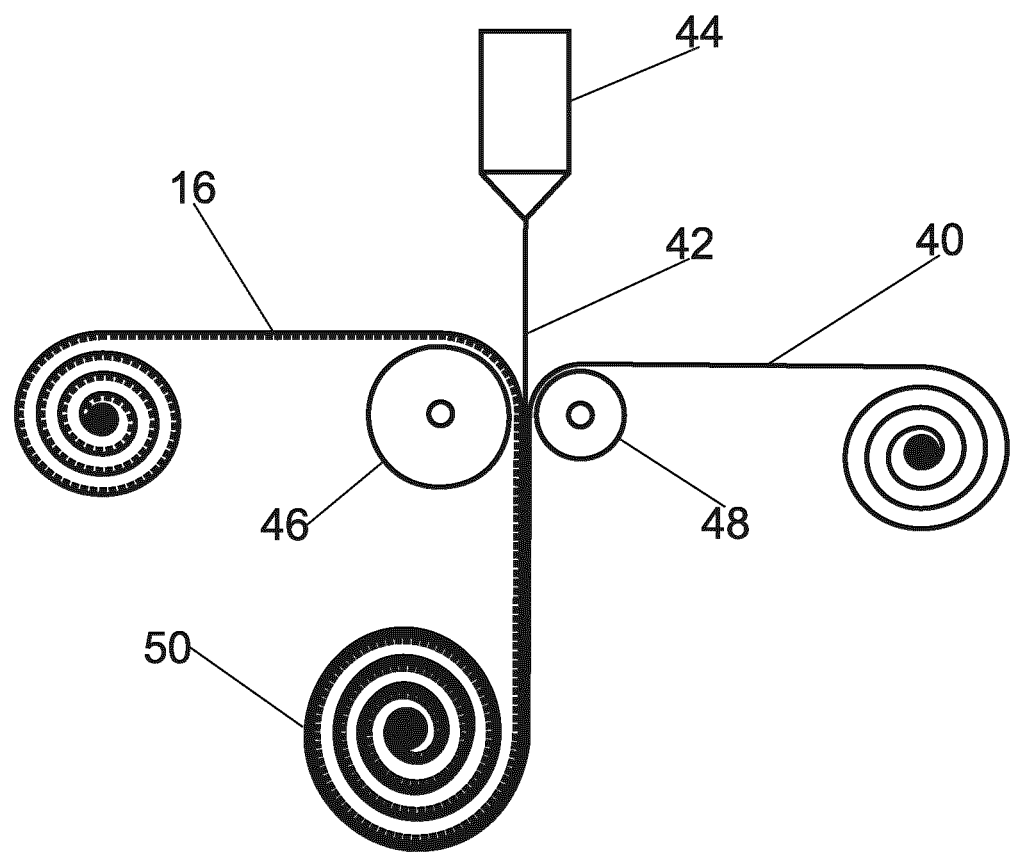
FIG. 12 is a schematic representation of a process for laminating the nonwoven high spot fabric of the present invention to a substrate.

The lamination process consists of taking the high spot nonwoven and combining it with another membrane material. FIG. 12 shows the standard lamination process for combining the high spot nonwoven fabric 16 with regular nonwoven 40. In this case, a high spot nonwoven 16 and a regular spot nonwoven 40 is fed into a lamination station where a hot lamination polymer 42 is extruded through a lamination die 44 so as to be sandwiched between the two nonwovens 16 and 40, which are forced together as they travel through the nip between chill roll 46 and rubber roll 48. Nip pressures and winder tension should be adjusted to ensure that the raised slip resistant spots are not flattened, with the finished combination then wound on a paper core to form a Jumbo roll 50 for further processing as necessary.

As discussed in more detail below, in the lamination process, temperature, pressure and cooling is controlled to achieve the best physical properties of the product and to ensure that the grip ("high") spot pattern remains effective. The product is also trimmed to the desired width prior to being wound on the paper core.

The product may also undergo further processing, such as a printing process in order to place product logo and other necessary information on it. Once processing has been completed, the product goes through "rewinding", where the Jumbo rolls are rewound into small 250 foot rolls and then packaged onto skids for shipping.

Additional manufacturing details are set out below.

Manufacturing Process

During production, the major focus was put on developing the "high spot" nonwoven manufacturing process, followed by the lamination process. Various trials were conducted as set out below.

Trial 1—Top Layer Nonwoven Thickness vs. Weight

A number of trials were conducted during which changes to the fiber density and weight were made. As the layer of nonwoven fibers passes through the calendering process, it is important that the cavities (inverted cups) 37 of the newly designed rollers 36 are not overfilled, as this would result in the creation of a solid surface. Accordingly, a variety of product weights were tested, from 150 grams per square meter (gsm) down to 50 gsm and the resulting effect on the non-slip surface and "angel hair" pattern (the random, unbonded fibers) was measured and observed.

Trials were conducted by reducing the weight per square meter from 150 gsm to 50 gsm in increments of 10 gsm. After running the various increments, it was determined that the heavier weights resulted in an end product that was too thick and expensive. Ultimately, four weights were selected for producing standard end weight products (15 and 30 lb): 50, 70, 80 & 90 gsm. These were tested with a slope tester and a magnifying glass to confirm the presence of sufficient unbonded fibers for grip stop requirements.

Trial 2—Calendering Temperature

As the weight trials were completed, the temperature of the calendaring process was also adjusted to ensure fusion of the thermoplastic fibers only occurs in the desired areas (the channels). If the temperature is too high, the high spot area fibers fuse together creating a slippery surface. Accordingly, trials were conducted for the calendaring process with the cavity roll heated to temperatures between 150 degrees Celsius to 130 degrees Celsius in increments of 2 degrees Celsius. After each test run, the bonding of the nonwoven fibers was observed in both the channel and high spot areas. A temperature of 142 degrees Celsius was observed to be the best for the required weights, with a range of approximately 142-146. At this temperature, the high spots remain unfused (unbonded) and the channel area was fused to create the desired pattern. In addition the bottom of the fabric is fused creating a smooth surface.

Trial 3—Resin Blend & Melt Selection

Various trials were conducted for the polypropylene melt flow properties. Polypropylene resin was selected from 22 MI to 35 MI for the trials. High melt flow resins are easier to process but produce a lower strength fiber. Testing started with a 35 MI resin which produced a good even profile fiber, but a lower strength fabric. Finally, a 25 MI polypropylene resin was selected in combination with 2% UV stabilizer masterbatch and 2% color additive to create an even flow and even profile of high spun nonwoven fabric. It was found that a higher colour ratio also tends to change the material flow and consequently the physical appearance and evenness of the resulting nonwoven fabric. A colour ratio of 1.5 to 2.5% was found to work best with the blend to produce the desired results.

Trial 4—Manufacturing Speed and Winding Tension

Various trials were conducted to ensure a stable process is maintained to achieve the right grip spot structure. Higher speeds resulted in warm fabric being wound with a resulting distortion to the high spot structure. Line speed trials from 80 to 40 meters per minute were conducted. As a result of these trials, it was determined that a line speed of 45-55 meters per minute produced satisfactory results along with the parameters determined from the first 3 trials discussed above.

The winding tension was also reduced to ensure the rolls were not wound too tight such that the high spots were flattened. Once the fabric cools down sufficiently and takes its final shape, the winding tension or pressure does not seem to affect the grip spots. Lower line speed also creates better annealing time for the nonwoven to settle in its desired design.

Lamination Process

The lamination process is critical to ensure the final product has suitable water proofing characteristics. The lamination process takes two separate nonwovens (one regular and one high spot) and laminates them together with the lamination layer acting as a water barrier. Type I products contain a mono lamination layer & Type II products contain two separate layers of polymer for lamination and antiskid properties. For example, for a type II product, the nonwoven high spot fabric 16 was laminated to a scrim and then an antiskid film was laminated to it.

The following trials were conducted to ensure the final product had the desired characteristics.

1. Product Blends

The product blends were optimized to ensure good lamination, water barrier properties, pliability, and softness for installation. The obvious choice for the lamination layer was polypropylene as the nonwoven fabrics are made of polypropylene. However, 100% polypropylene used for lamination created a very stiff and hard to work product. A low density polyethylene was added in increments of 5% up to 30%. At 30% some poor lamination effects were observed and it was reduced to 25% where good lamination was achieved with a resulting softer, and easier to work with, product. Water ponding and rain tests were conducted to ensure the product has suitable water barrier properties. A 2% UV additive was added to ensure UV stability of the product.

2. Process Parameter Optimization

A temperature profile was created for the above blend to maximize lamination and reduce degradation of the polymer. A high temperature results in higher polymer flow, which in turn results in penetration of the polymer through the nonwoven creating a slippery surface and poor water barrier properties. A temperature range of 260-265 degrees Celsius was established to ensure the desired physical and barrier properties of the fabric.

3. NIP Pressure

Along with resin blend and temperature of extrudate, the NIP pressure plays an important role. Higher NIP pressure will damage the high spot surface, impregnate laminate polymer into the nonwoven layers, and create an uneven lamination film layer, which in turn can damage the water barrier properties of the product. Trials were conducted from 90 PSI down to 30 PSI on Nip rollers of laminate. It was determined that a range of 40-50 PSI performed the best for lamination and film integrity. Both water ponding and rain tests were conducted to ensure the desired physical outcome. The NIP rollers selected for this process were a steel "chill" roller and a silicone "rubber" roller with greater than 60 durometer hardness to achieve the best results.

It is contemplated that the high spot non woven product produced with our new cavity calendar roll can be used in more than just roofing applications. For example, it could be used as a housewrap, as a breathable underlayer should this be desired, or as a house enveloped membrane.

As discussed above, the high spot nonwoven can be combined with a plurality of different types of membrane layers depending on the desired characteristics for the end product. For example, the high spot nonwoven could be laminated to an antislip film with a lamination layer of polypropylene or polyethylene, or it could be coated directly with an antislip coating to improve the back side (bottom surface) slip resistance. A further example would be the type II product discussed above where the high spot nonwoven is laminated to a woven scrim (preferably formed of polyethylene or polypropylene) with a lamination layer of polyethylene or polypropylene. If desired, the back side of the woven scrim may be further coated with an antislip/antiskid coating.

It will be readily appreciated by those skilled in the art that various modifications and variations of the present invention may be devised without departing from the scope or spirit of the invention

The invention claimed is:

1. A system, comprising:
   a roof deck;
   a plurality of roofing shingles; and
   a roofing membrane installed above the roof deck,
      wherein the roofing membrane comprises:
         a calendered sheet;
         a resin lamination layer; and
         a scrim layer; and
            wherein the calendered sheet comprises a polymer resin;
            wherein the calendered sheet comprises:
               a) a plurality of elevated portions of random unbonded fibers, and
               b) bonded fibers in channels between the plurality of elevated portions;
            wherein the resin lamination layer:
               a) is between the calendered sheet and scrim layer, and
               b) extends at least from a first end of the calendered sheet to a second end of the calendered sheet opposite the first end, and
            wherein the scrim layer extends at least from the first end of the calendered sheet to the second end of the calendered sheet,
         wherein the roofing membrane is between the plurality of roofing shingles and the roof deck.
2. The system of claim 1, wherein the polymer resin comprises polypropylene, polyethylene, polyester, or nylon.
3. The system of claim 1, wherein the scrim layer comprises a woven material.
4. The system of claim 3, wherein the woven material comprises at least one of polyethylene or polypropylene.
5. The system of claim 1, wherein the resin lamination layer comprises a polymer.
6. The system of claim 1, wherein the resin lamination layer comprises:
   between 5% and 30% low-density polyethylene, and polypropylene.
7. The system of claim 1, wherein the roofing membrane further comprises:
   a resin coating layer,
      wherein the resin coating layer is on the scrim layer, and extends at least from the first end of the calendered sheet to the second end of the calendered sheet.
8. The system of claim 7, wherein the resin coating layer comprises a film.
9. The system of claim 8, wherein the film comprises at least one of polyethylene and polypropylene.
10. The system of claim 1, wherein the resin lamination layer comprises polyethylene and polypropylene.
11. A system, comprising:
    a roof deck;
    at least one roofing shingle; and
    a roofing membrane,
       wherein the roofing membrane comprises:
          a calendered sheet;
          a resin lamination layer; and
          a scrim layer; and
             wherein the calendered sheet comprises a resin;
             wherein the calendered sheet comprises:
                a plurality of elevated portions of random unbonded fibers, and
                bonded fibers in channels between the plurality of elevated portions;
             wherein the resin lamination layer:
                is between the calendered sheet and scrim layer, and extends at least from a first end of the calendered sheet to a second end of the calendered sheet opposite the first end, and
             wherein the scrim layer extends at least from the first end of the calendered sheet to the second end of the calendered sheet,
          wherein the roofing membrane is between the at least one roofing shingle and the roof deck.
12. The system of claim 11, wherein the resin comprises polypropylene, polyethylene, polyester, or nylon.
13. The system of claim 11, wherein the scrim layer comprises a woven material.
14. The system of claim 13, wherein the woven material comprises at least one of polyethylene or polypropylene.
15. The system of claim 11, wherein the resin lamination layer comprises a polymer.
16. The system of claim 11, wherein the resin lamination layer comprises:
    between 5% and 30% low-density polyethylene, and polypropylene.
17. The system of claim 11, wherein the roofing membrane further comprises:
    a resin coating layer,
       wherein the resin coating layer is on the scrim layer, and extends at least from the first end of the calendered sheet to the second end of the calendered sheet.
18. The system of claim 17, wherein the resin coating layer comprises a film.
19. The system of claim 18, wherein the film comprises at least one of polyethylene and polypropylene.
20. The system of claim 11, wherein the resin lamination layer comprises polyethylene and polypropylene.

* * * * *